United States Patent [19]

Komiya

[11] Patent Number: 5,282,893
[45] Date of Patent: Feb. 1, 1994

[54] ETHANOL TYPE MARKING INK COMPOSITION

[75] Inventor: Motohiro Komiya, Yokohama, Japan

[73] Assignee: Mitsubishi Pencil Kabushiki Kaisha, Tokyo, Japan

[21] Appl. No.: 808,421

[22] Filed: Dec. 16, 1991

[30] Foreign Application Priority Data

Jan. 31, 1991 [JP] Japan ................. 3-029011

[51] Int. Cl.5 ........................... C09D 11/16
[52] U.S. Cl. ..................... 106/19 R; 106/20 R; 106/447
[58] Field of Search ............ 106/19, 20, 30, 447, 106/436, 19 R, 20 R, 30 R

[56] References Cited

U.S. PATENT DOCUMENTS

| | | | |
|---|---|---|---|
| 3,819,386 | 6/1974 | Higgins et al. | 106/27 |
| 3,849,150 | 11/1974 | Schrempp et al. | 106/493 |
| 3,961,965 | 6/1976 | Zwahlen | 106/26 |
| 4,097,289 | 6/1978 | Hofmann et al. | 106/30 |
| 4,177,075 | 12/1979 | Mansukhani | 106/30 |
| 4,183,685 | 1/1980 | Hofmann et al. | 106/30 |
| 4,401,470 | 8/1983 | Bridges | 106/30 |
| 4,654,082 | 3/1987 | Frilette | 106/30 |
| 4,664,711 | 5/1987 | Kawaguchi et al. | 106/30 |
| 4,680,058 | 7/1987 | Shimizu et al. | 106/30 |

OTHER PUBLICATIONS

BASF, Technical Information, Laropal A 101, May 1985.
BASF, Technical Information, Laropal A 81 Feb. 1983.

*Primary Examiner*—Helene Klemanski
*Attorney, Agent, or Firm*—Darby & Darby

[57] ABSTRACT

An ethanol type marking ink composition comprises ethanol as a main solvent, titanium oxide and a condensation product of urea and aliphatic aldehydes. The composition is less toxic and gives good fixability, weather resistance and fastness of drawing lines. The redispersing property of titanium oxide is good even after a long time storage.

4 Claims, No Drawings

ETHANOL TYPE MARKING INK COMPOSITION

BACKGROUND OF THE INVENTION

1. Field of the Invention

The present invention relates to an ethanol marking ink composition, and more particularly, to an ethanol marking ink composition containing titanium oxide dispersed therein for a marking pen.

2. Description of the Related Art

Conventional quick-drying pigment inks for marking pens in which titanium oxide is dispersed contain an organic solvent harmful to man such as xylene and the like as a main solvent. When such a marking pen is actually used, man inevitably inhales the organic solvent harmful to man.

Therefore, it is desirable to use an ink comprising a less toxic and quick-drying organic solvent such as ethanol and the like as a main solvent. However, when ethanol is used as a main solvent, it is difficult to select a resin which can impart good fixability, weather resistance, and fastness to drawing lines and in which titanium oxide, a white coloring agent having a high hiding power, can be dispersed.

Among organic solvents, ethanol has a structure similar to water. Therefore, resins soluble in ethanol are also soluble in water.

On the other hand, xylene, a conventional main solvent, can dissolve a resin insoluble in water since xylene is an aromatic hydrocarbon, and therefore, xylene has been used for a long time in spite of the toxicity to man. The ink composition containing xylene is quick-drying and the drawing lines have excellent fixability, weather residence, and fastness, but there are disadvantages that when the pen is allowed to vertically stand, titanium oxide precipitates to form a hard cake and the titanium oxide thus precipitated can not be dispersed again by shaking the pen for stirring and moreover when the pen is allowed to stand still for a long period of time, writing becomes difficult.

SUMMARY OF THE INVENTION

An object of the present invention is to provide an ethanol marking ink composition of low toxicity.

Another object of the present invention is to provide an ethanol marking ink composition giving drawing lines having good fixability, weather resistance and fastness.

A further object of the present invention is to provide an ethanol marking ink composition free from hard caking of titanium oxide.

Still another object of the present invention is to provide an ethanol marking ink composition in which redispersion of titanium oxide can be easily effected.

A still further object of the present invention is to provide an ethanol marking ink composition having low viscosity, good flowing-out property and good leveling property.

Still another object of the present invention is to provide an ethanol marking ink composition capable of giving quick-drying written lines.

A still further object of the present invention is to provide an ethanol marking ink composition giving drawing lines of an excellent hiding property.

According to the present invention, there is provided an ethanol marking ink composition which comprises ethanol as a main solvent, titanium oxide and a condensation product of urea and aliphatic aldehydes.

DESCRIPTION OF THE PREFERRED EMBODIMENTS

The ethanol marking ink composition of the present invention can be prepared, for example, by dispersing titanium oxide and a condensation product of urea and aliphatic aldehydes such as, for example, Laropal A 81, Laropal A 101 (trade name, supplied by BASF) in a solvent containing mainly ethanol, coloring the resulting base with a dye or pigment, and if desired, adding other resins and a surface active agent to form an ink composition. Further, the ink composition may be produced by other procedures such as changing the order of adding and mixing the components.

The composition of the solvent comprises preferably 50% by weight or more of ethanol. Other solvent components which can be mixed with ethanol as alcohol modifiers are preferably water, methanol, propanol, isopropanol, ethyl acetate and the like which may be usually used for modifying or denaturing ethanol.

The amount of ethanol is usually at least 10% by weight based on the total composition. When used as an ordinary marking ink for writing letters, drawing images and the like, it is preferably 60–80% by weight based on the total composition.

Further, any solvent may be added to ethanol as far as the resulting solvent mixture can dissolve the condensation product of urea and aliphatic aldehydes.

Titanium oxide is dispersed in ethanol in an amount of 70% by weight or less based on the total composition.

The types of coloring agents other than titanium oxide which may be added to the ink composition of the present invention are not critical. Any organic or inorganic pigments may be used as far as the pigments have been heretofore usually contained in pigment ink compositions for conventional marking pens.

Exemplary suitable inorganic pigments include carbon black, metal oxides and the like.

Exemplary suitable organic pigments include azo lakes, insoluble azo pigments, chelate azo pigments, phthalocyanine pigments, perylene and perinone pigments, anthraquinone pigments, quinacridone pigments, dye lakes, nitro pigments, nitroso pigments, and the like.

When dyes are used as coloring agents, acid dyes and basic dyes may be used whether the dyes are oil soluble or water soluble.

The coloring agents may be used alone or in combination. The amount of the coloring agent usually ranges from 0.01 to 30% by weight, preferably from 5 to 15% by weight based on the total amount of the ink composition.

The condensation product of urea and aliphatic aldehydes may be used in an amount of 0.5–70% by weight, preferably 1–30% by weight based on the total amount of the ink composition.

When the amount of the resin is less than 0.5% by weight, the desired lubricating property is not sufficiently exhibited. On the contrary, when the amount of the resin exceeds 70% by weight, the viscosity of the ink composition becomes so high that the ink composition does not flow out sufficiently.

If desired, there may be added various additives such as surface active agents, resins compatible with the condensation product of urea and aliphatic aldehydes, plasticizers and the like to the ink composition.

According to the present invention, when titanium oxide is dispersed in ethanol as a main solvent and the condensation product of urea and aliphatic aldehydes is incorporated therein, the resulting ink composition exhibits good dispersion property and stable dispersion. The reason for the surprising good characteristics is not clearly understood. Although it is not desired to limit the invention to any particular mechanism, it is believed that the bonding force between the condensation product of urea and aliphatic aldehydes and titanium oxide is very strong and a steric hindrance often mentioned in the study of dispersions, functions to prevent aggregation. Further, the reason for good fixability, weather resistance and fastness of the drawing image formed by the ink composition of the present invention is not clear, but it is believed that the resin used in the present invention is not easily deteriorated by ultraviolet light and heat and further the coat film containing titanium oxide exhibits a high and excellent hydrolysis resistance by reinforcing and hardening the coat film with the pigment.

The ethanol marking ink composition of the present invention has at least partly the following advantages.

i) Low toxicity, and less pollution.

ii) Lines or images drawn with the ink composition have good fixability, weather resistance and fastness.

iii) Free from hard caking of titanium oxide even when stored for a long period of time.

iv) Titanium oxide can be easily dispersed again, for example, by a simple shaking with a hand.

v) The viscosity of the ink composition is low, and the ink flows out well and has good leveling property.

vi) The drawing lines or images are quick-drying.

vii) The drawing lines or images have high hiding power.

The present invention is described more in detail by the following non-limiting examples. Percents (%) in the following are by weight unless otherwise specified.

| EXAMPLE 1 | | |
|---|---|---|
| Pigment | Titanium oxide R-820 (manufactured by Ishihara Sangyo K.K.) | 16.0% |
| Resin | Laropal A81 (manufactured by BASF) | 10.0% |
| Coloring agent | Aizen Spilon Blue 2BNH (manufactured by Hodogaya Kagaku K.K.) | 4.0% |
| Plasticizer | Castor oil | 0.3% |
| Solvents | Ethanol | 56.0% |
| | Isopropanol | 13.0% |
| | Ethyl acetate | 0.7% |
| | | 100.0% |

| EXAMPLE 2 | | |
|---|---|---|
| Pigment | Titanium oxide R-930 (manufactured by Ishihara Sangyo K.K.) | 18.0% |
| Resin | Laropal A101 (manufactured by BASF) | 14.0% |
| Coloring agent | Aizen Spilon Red GRLH special (manufactured by Hodogaya Kagaku K.K.) | 5.0% |
| Plasticizer | Castor oil | 0.4% |
| Solvents | Ethanol | 60.7% |
| | Isopropanol | 1.0% |
| | Ethyl acetate | 0.9% |
| | | 100.0% |

| COMPARISON EXAMPLE 1 | | |
|---|---|---|
| Pigment | Titanium oxide R-820 (manufactured by Ishihara Sangyo K.K.) | 16.0% |
| Resin | Shellac NSC (manufactured by Nihon Shellac Kogyo K.K.) | 10.0% |
| Coloring agent | Aizen Spilon Blue 2BNH (manufactured by Hodogaya Kagaku K.K.) | 4.0% |
| Plasticizer | Castor oil | 0.3% |
| Solvents | Ethanol | 56.0% |
| | Isopropanol | 13.0% |
| | Ethyl acetate | 0.7% |
| | | 100.0% |

| COMPARATIVE EXAMPLE 2 | | |
|---|---|---|
| Pigment | Titanium oxide R-930 (manufactured by Ishihara Sangyo K.K.) | 18.0% |
| Resin | Gum rosin WW (manufactured by Yasuhara Kogyo K.K.) | 9.0% |
| Coloring agent | Aizen Spilon Red GRLH special (manufactured by Hodogaya Kagaku K.K.) | 5.0% |
| Plasticizer | Castor oil | 0.4% |
| Solvents | Xylene | 56.7% |
| | Ethyl acetate | 10.9% |
| | | 100.0% |

Each of the formulas in Examples 1 and 2 and Comparative Examples 1 and 2 was prepared and dispersed for 8 hours in a ball mill to form an ink composition. The test result is described in Table 1.

TABLE 1

| Test item | Example 1 | Example 2 | Comparative Example 1 | Comparative Example 2 |
|---|---|---|---|---|
| Viscosity (cps, 25° C.) | 14.1 | 19.2 | 19.4 | 21.8 |
| Writing property 1) | ◉ | ○ | △ | X |
| Hiding property 2) | ○ | ◉ | X | △ |
| Storing property 3) | ◉ | ○ | △ | X |
| Water resistance | ○ | ◉ | ○ | △ |

TABLE 1-continued

| Test item | Example 1 | Example 2 | Comparative Example 1 | Comparative Example 2 |
|---|---|---|---|---|
| 4) | | | | |

Note
1) Handwriting on a surface of paper was evaluated.
ⓞ Ink flowing-out is very good
○ Ink flowing-out is good
△ A handwritten line is somewhat blurred
X A handwritten line is blurred
2) Handwriting was made on an art paper with black line and the result was evaluated with eyes.
ⓞ Black liens are not seen at all
○ Black lines are hardly seen
△ Black lines are seen clearly
X No color is formed on black lines
3) Hardness of the precipatated cake formed after storing at 50° C. for three months.
ⓞ Very soft
○ soft
△ Hard
X Very hard
4) The ink composition was applied to a glass plate, dried sufficiently and soaked in water at 25° C. for 5 minutes. Then, the state of the coat film thus treated was evaluated.
ⓞ No change
○ Peeled off when rubbed
△ More than a half of the coat film was peeled off
X Completely peeled off

What is claimed is:

1. An ethanol marking ink composition which comprises 0.5–70% of the condensation product of urea and aliphatic aldehyde, titanium oxide in an amount up to 70%, 0.01–30% of a coloring agent other than titanium oxide, and 56–80% of ethanol by weight based on the total composition.

2. An ethanol marking ink composition which comprises 1–30% of the condensation product of urea and aliphatic aldehydes, titanium oxide in an amount up to 70%, 5–15% of a coloring agent other than titanium oxide, and 56–80% of ethanol by weight based on the total composition.

3. An ethanol marking ink composition according to claim 2 in which titanium oxide is dispersed in ethanol in an amount of up to 18% by weight based on the total composition.

4. An ethanol marking ink composition according to claim 2 in which titanium oxide is dispersed in ethanol in an amount of from 16–18% by weight based on the total composition.

* * * * *